United States Patent
Hino et al.

(10) Patent No.: US 8,970,087 B2
(45) Date of Patent: Mar. 3, 2015

(54) ION CONDUCTING ACTUATOR

(75) Inventors: Tetsuo Hino, Yamato (JP); Sotomitsu Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 13/583,907

(22) PCT Filed: May 11, 2011

(86) PCT No.: PCT/JP2011/061355
§ 371 (c)(1),
(2), (4) Date: Sep. 10, 2012

(87) PCT Pub. No.: WO2011/145636
PCT Pub. Date: Nov. 24, 2011

(65) Prior Publication Data
US 2013/0002090 A1   Jan. 3, 2013

(30) Foreign Application Priority Data

May 18, 2010 (JP) ................................. 2010-114476

(51) Int. Cl.
*H02N 11/00* (2006.01)
(52) U.S. Cl.
USPC .......................................... 310/300; 310/309
(58) Field of Classification Search
CPC ........ F03G 7/005; H02N 1/002; H02N 1/004; H02N 1/006
USPC .................................. 310/300, 309
See application file for complete search history.

(56) References Cited

U.S. PATENT DOCUMENTS

| 8,378,551 | B2* | 2/2013 | Hino et al. | 310/300 |
| 8,487,505 | B2* | 7/2013 | Ikushima et al. | 310/300 |
| 2004/0251794 | A1* | 12/2004 | Krogh et al. | 310/800 |
| 2009/0174282 | A1* | 7/2009 | Akamatu | 310/309 |
| 2012/0032553 | A1* | 2/2012 | Goyal et al. | 310/300 |
| 2012/0133243 | A1* | 5/2012 | Okuzaki et al. | 310/300 |
| 2012/0161574 | A1* | 6/2012 | Hino et al. | 310/300 |
| 2013/0119821 | A1* | 5/2013 | Hino et al. | 310/300 |
| 2013/0293063 | A1* | 11/2013 | Takamatsu et al. | 310/309 |
| 2013/0307370 | A1* | 11/2013 | Jenninger et al. | 310/300 |

FOREIGN PATENT DOCUMENTS

| JP | 2000-83389 A | 3/2000 |
| JP | 2005-176412 A | 6/2005 |

(Continued)

*Primary Examiner* — Hanh Nguyen
(74) *Attorney, Agent, or Firm* — Canon U.S.A., Inc. IP Division

(57) ABSTRACT

Provided is an ion conducting actuator that easily allows reduction in size and integration thereof, compared to existing one, and gives a large generating force. The columnar ion conducting actuator includes a tubular member serving as a first electrode, an ion-supplying material disposed inside the tubular member, and linear second electrodes disposed inside the tubular member. The ion-supplying material lies between the inner wall of the tubular member and the second electrodes and includes a polymer gel containing positive ions and negative ions. The tubular member contains a plurality of the second electrodes. Either the positive ions or the negative ions contained in the polymer gel move toward the plurality of second electrodes side and the other ions move toward the inner wall side of the tubular member by applying a voltage between the tubular member and the plurality of the second electrodes to elongate the ion conducting actuator.

6 Claims, 3 Drawing Sheets

(56) References Cited

FOREIGN PATENT DOCUMENTS

| JP | 2005-176428 A | 6/2005 |
| JP | 2006-125396 A | 5/2006 |
| JP | 2008-277729 A | 11/2008 |

\* cited by examiner

ION CONDUCTING ACTUATOR

TECHNICAL FIELD

The present invention relates to an ion conducting actuator.

BACKGROUND ART

Recently, polymer actuators (soft actuators) that can be driven at a low voltage of about several volts and have light weights and excellent flexibility have been developed. The driving systems of actuators are roughly classified into expansion/contraction drive and bending drive. The expansion/contraction drive hardly causes buckling and is suitable for application to pushing movement.

As the expansion/contraction type actuator, an ion conducting actuator using a change in volume of an electrically conductive polymer such as polypyrrole or polyaniline is known. The change in volume of the electrically conductive polymer is based on taking in and out of electrolyte ions (dopant ions) in an electrolytic solution due to an oxidation-reduction reaction.

That is, electrolyte ions in an electrolytic solution are accumulated in an electrically conductive polymer layer or accumulated ions are released to the electrolytic solution, by voltage application. As a result, the electrically conductive polymer layer expands or contracts and thereby functions as an elastic electrode layer.

PTL 1 describes a configuration in which a plurality of expansion/contraction devices having a voltage-applying section is disposed in a cylindrical counter electrode section, and, inside the cylindrical counter electrode section, the space between the inner circumference of the counter electrode section and the outer surfaces of the expansion/contraction devices having the voltage-applying section is filled with an electrolyte.

CITATION LIST

Patent Literature

PTL 1 Japanese Patent Laid-Open No. 2000-83389

SUMMARY OF INVENTION

Technical Problem

In the configuration described in PTL 1, the reduction in size and the integration are limited. For example, it is difficult to configure an actuator including a plurality of expansion/contraction devices having a diameter of about 1 mm. Furthermore, buckling of the expansion/contraction devices disposed in the inside tends to occur. Consequently, the generating force as a whole of the actuator is hardly increased.

The present invention provides an ion conducting actuator that easily allows a reduction in size and integration thereof and gives a large generating force, compared to existing one.

Solution to Problem

The actuator according to the present invention is a columnar ion conducting actuator including a tubular member serving as a first electrode, an ion-supplying material disposed inside the tubular member, and linear second electrodes disposed inside the tubular member, wherein the ion-supplying material lies between the inner wall of the tubular member and the second electrodes and includes a polymer gel containing positive ions and negative ions; the tubular member contains a plurality of the second electrodes; and either the positive ions or the negative ions contained in the polymer gel move toward the plurality of second electrodes side and the other ions move toward the inner wall side of the tubular member by applying a voltage between the tubular member and the plurality of second electrodes to elongate the ion conducting actuator.

Advantageous Effects of Invention

According to the present invention, both an ion-supplying material including a polymer gel containing positive ions and negative ions and a plurality of linear second electrodes are disposed inside a tubular member. By doing so, the polymer gel supports the force generated by expansion of the second electrodes and, thereby, the force is efficiently transmitted in the elongation direction. As a result, a structure that gives a large generating force as a whole actuator can be provided. In addition, since the polymer gel lies between the inner wall of the tubular member and the second electrodes and can support the linear electrodes, the linear electrodes can be immobilized without floating in the tubular member even if each of the linear electrodes is thin. Therefore, the ion conducting actuator can be reduced in size and is allowed to be integrated.

DESCRIPTION OF EMBODIMENTS

Embodiments of the present invention will be described in detail below with reference to the drawings.

Figure 1A:
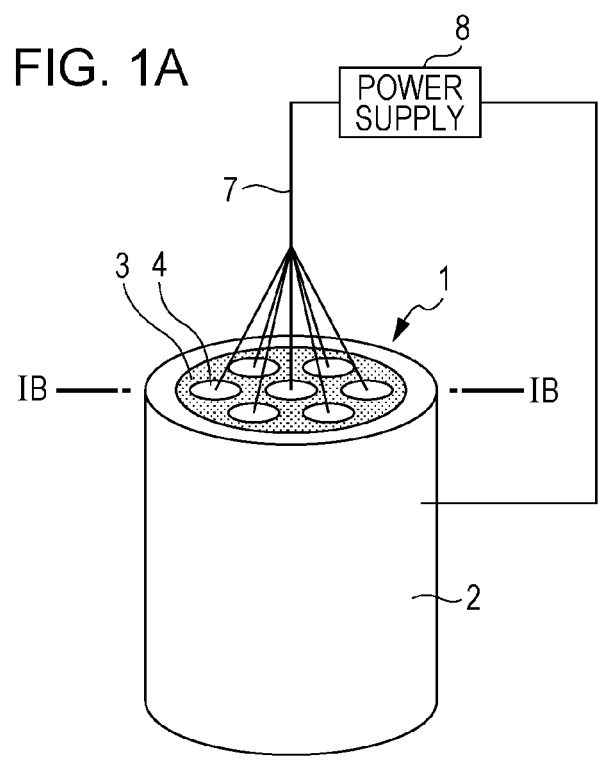
FIG. 1A is a perspective view schematically illustrating an actuator.

FIG. 1A is a perspective view schematically illustrating an ion conducting actuator 1 having a columnar structure according to an embodiment of the present invention.

The actuator according to the present invention is a columnar ion conducting actuator including a tubular member 2 serving as a first electrode, an ion-supplying material 3 disposed in the tubular member 2, and linear second electrodes 4 disposed in the tubular member 2.

Figure 1B:
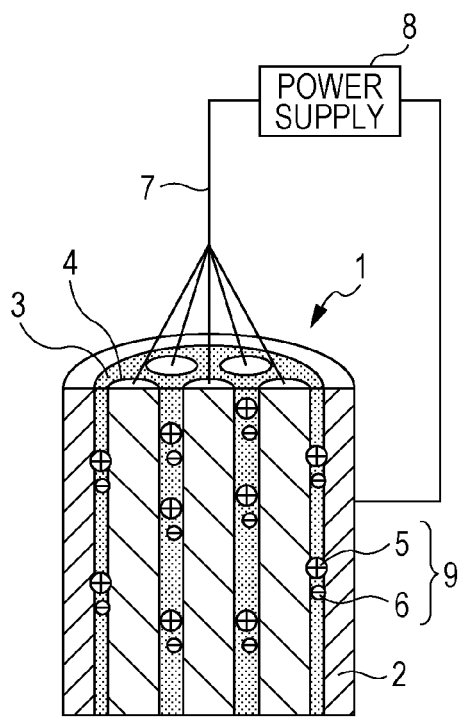
FIG. 1B is a schematic cross-sectional view taken along the line IB-IB of FIG. 1A before voltage application.

FIG. 1B is a cross-sectional view of the actuator 1 taken along the line IB-IB of FIG. 1A.

As shown in FIG. 1B, the ion-supplying material 3 lies between the inner wall of the tubular member 2 and the second electrodes 4 and includes a polymer gel containing positive ions 5 and negative ions 6.

Figure 1C:
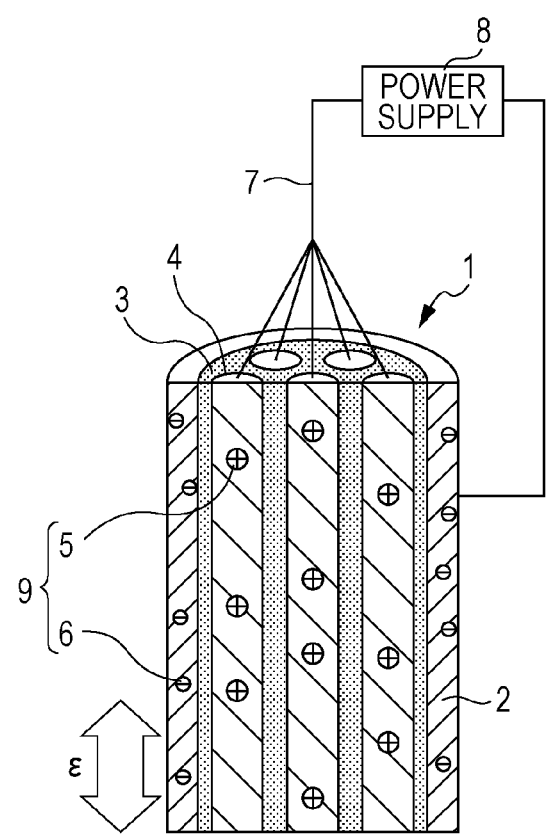
FIG. 1C is a schematic cross-sectional view taken along the line IB-IB of FIG. 1A during voltage application.

The plurality of second electrodes 4 is disposed inside the tubular member 2. Herein, by applying a voltage between the tubular member 2 and the plurality of second electrodes 4, as shown in FIG. 1C, either ions of the positive ions 5 or the negative ions 6 contained in the polymer gel move toward the plurality of second electrodes 4 side, and the other ions move toward the inner wall side of the tubular member 2, which elongates the ion conducting actuator in the elongation direction (the direction shown by the arrow) of the tubular member.

The linear second electrodes 4 are constituted of electrodes having elasticity (elastic electrodes) that can expand and contract. The first electrode 2 and the second electrodes 4 are connected to a power supply 8 via respective leads 7. The ions of electrolyte in the ion-supplying material 3 move to the electrode portion by voltage application with the power supply 8 to accumulate the ions in the electrode portion, which causes expansion in volume of the electrode portion. Furthermore, after the expansion, by applying a voltage in the converse direction, the ions are released from the insides of the electrodes to cause contraction in volume of the electrode portion.

The regions that expand and contract are dispersed in the actuator by arranging a plurality of the linear second electrodes. By doing so, a more stable force is generated as a whole actuator, compared to that in an actuator having only one elastic electrode disposed in the central axis. Furthermore, all the plurality of the linear second electrodes simultaneously takes in ions from the ion-supplying material lying therearound. That is, the linear second electrodes each rapidly take in ions therearound and expand to generate a large force in total.

The plurality of linear second electrodes is immobilized by the solid or semisolid polymer gel of the ion-supplying material surrounding the linear second electrodes. Therefore, even though the second electrodes are each formed in a thin, linear shape, they can be arranged without floating in the tubular member. In particular, it is unnecessary to arrange a self-standing structure, such as a spring, around each of the linear second electrodes by unifying the plurality of linear second electrodes and the ion-supplying material surrounding the second electrodes into an expansion/contraction portion. As a result, an ion conducting actuator further reduced in size can be provided.

Furthermore, since the plurality of second electrodes efficiently takes in ions, a structure giving a large generating force as a whole actuator can be provided.

The plurality of second electrodes 4 and the first electrode 2 have been described using elastic electrode layers that expand and contract by voltage application, but the first electrode 2 may have a structure (such as a metal tube) that does not expand and contract.

The actuator 1 having a columnar structure of the embodiment includes a tubular member 2 serving as the first electrode disposed on the outer circumference of the columnar structure, seven linear elastic second electrodes 4 disposed inside the tubular member as the first electrode, and an ion-supplying material 3 disposed between the linear second electrodes and the tubular member as the first electrode.

The tubular member as the first electrode and the linear second electrodes are separated from each other by the ion-supplying material. The linear second electrodes may not be necessarily separated from one another completely, but may be arranged so as to be at least partially separated from one another.

The operating principle of the ion conducting actuator is based on movement of ions to the inside and outside of the elastic electrode layer of the actuator caused by voltage application. As in the embodiment, the distance between the electrodes is shortened by arranging the plurality of linear second electrodes so as to be closer to the tubular member than the center of the tubular member, and thereby the linear second electrodes can rapidly take in ions in the electrolyte layer present between the electrodes.

In addition, ions near the linear electrodes can be rapidly taken in each electrode by arranging the plurality of linear electrodes. That is, as an actuator structure, ions can be efficiently taken in. This increases the generating force of the actuator.

On the other hand, ions cannot be efficiently taken in by merely increasing the volume of a tubular member serving as the first electrode of the actuator or a single elastic electrode layer disposed at the center of the actuator (an increase in thickness or in diameter). This is because that the migration length of ions in the elastic electrode layer (the minimum distance from the portion at which the elastic electrode layer is in contact with the ion-supplying material to the portion at which the elastic electrode layer is most apart from the ion-supplying material: abbreviated to ion dispersion distance) is necessarily elongated.

An actuator structure according to an embodiment of the present invention will be described in detail below.

As shown in FIG. 1A, an ion conducting actuator 1 having seven rod-like electrodes as the linear elastic second electrode will be described.

The actuator includes, as described above, linear second electrodes 4, an ion-supplying material 3 disposed so as to be in contact with the outer surfaces of the linear second electrodes and containing electrolytes, and a tubular member 2 serving as the first electrode disposed so as to be in contact with the outer circumference of the ion-supplying material. The ion-supplying material 3 fills the space between the inner wall of the tubular member and the second electrodes and includes a polymer gel containing positive ions and negative ions.

The expansion/contraction portion where expansion/contraction deformation occurs during voltage application is formed by unifying the ion-supplying material and the linear electrodes by the polymer gel.

In this structure, the generating force that is generated by expansion/contraction of the linear second electrodes can be determined as follows.

The force ($P_1$) generated by the linear second electrodes (total of the plurality of electrodes) is defined by $S_1 \times \delta_1$, wherein $S_1$ and $\delta_1$ respectively represent cross-sectional area and stress of the linear second electrodes, from the following Expression [1]:

$$\text{Force } (P) = \text{cross-sectional area } (S) \times \text{stress } (\delta) \qquad \text{Expression [1]}.$$

In addition, since the stress can be defined by the following Expression [2]:

$$\text{Stress } (\delta) = \text{Young's modulus } (Y) \times \text{strain } (\epsilon) \qquad \text{Expression [2]},$$

and $P_1$ is therefore defined by $S_1 \times Y_1 \times \epsilon_1$, wherein $Y_1$ and $\epsilon_1$ respectively represent Young's modulus and strain of the linear second electrodes. Similarly, in the expansion/contraction portion, the force ($P_2$) that occurs area other than the linear second electrodes can be defined by $S_2 \times Y_2 \times \epsilon_2$.

In the expression, $S_2$, $Y_2$, and $\epsilon_2$ respectively represent cross-sectional area, Young's modulus, and strain of the area other than the linear second electrodes. When the expansion/contraction portion is composed of the linear second electrodes and the polymer gel of the ion-supplying material as shown in FIG. 1A, $S_2$, $Y_2$, and $\epsilon_2$ are respectively the cross-sectional area, Young's modulus, and strain of the ion-supplying material.

On the other hand, the force P (total) that is generated by the whole expansion/contraction portion is defined by Expression [3]:

$$P(\text{total}) = S \times Y \times \epsilon = S_1 \times Y_1 \times \epsilon_1 + S_2 \times Y_2 \times \epsilon_2 \quad \text{Expression [3]}.$$

In the present invention, the linear second electrodes effectively work when the following requirements shown by Expressions (A) and (B) are simultaneously satisfied:

$$(A) \; S_1 \times \delta_1 \geq S_2 \times \delta_2 \quad \text{Expression [4], and}$$

$$(B) \; \epsilon_1 = \epsilon_2 \quad \text{Expression [5]}.$$

Expression (B) means that the expansion/contraction portion is unified and that the strain caused by expansion/contraction of the linear second electrodes and the strain caused by expansion/contraction of the area other than the linear second electrodes are balanced to each other.

This result is shown by the following expression:

$$S_1 \times Y_1 \geq S_2 \times Y_2 \quad \text{Expression [6]}.$$

Expression [3] can be changed to the following Expression [7]:

$$S_2 \times Y_2 = S \times Y - S_1 \times Y_1 \quad \text{Expression [7]}.$$

The result above leads Expression [8]:

$$S_1 \times Y_1 \geq \tfrac{1}{2}(S \times Y) > 0 \quad \text{Expression [8]}.$$

That is, in a cross section of an actuator in the direction perpendicular to the long length direction of the linear second electrodes, in the following definitions,
S: the total area of the actuator in the above-mentioned cross section,
$S_1$: the area of the linear second electrodes in the above-mentioned cross section,
Y: Young's modulus of the actuator, and
$Y_1$: Young's modulus of the linear second electrode, the actuator can be constituted so as to satisfy the Expression [8].

That is, in the cross section of the actuator in the direction perpendicular to the long length direction of the linear second electrodes, the whole generating force can be caused by expansion/contraction of the linear second electrodes by satisfying the above-mentioned Expression [8].

Within the Expression [8], in a columnar expansion/contraction type actuator having the linear second electrodes, the ion-supplying material disposed so as to be in contact with outer circumference of the linear second electrodes and containing electrolytes, and the tubular member disposed so as to be in contact with the outer circumstance of the ion-supplying material and serving as the first electrode, the inner electrodes (linear second electrodes) can effectively contribute to elongation drive (the actuator is predominantly driven by expansion/contraction of the inner electrodes) in the actuator. However, the Expression [8] is a conditional expression when the whole actuator expands and contracts by only the force generated by the second electrodes. The generating force due to the expansion and contraction of the tubular member serving as the first electrode may be utilized, and in such a case, the Expression [8] may not be necessarily satisfied.

The structure of an ion conducting actuator of the present invention will be described in detail below.

The tubular member 2 serving as the first electrode is disposed so as to coat the outer circumference of the expansion/contraction portion composed of the linear second electrodes 4 and the ion-supplying material including a polymer gel. When the tubular member 2 has elasticity, the expansion/contraction portion may be formed integrally including the tubular member 2.

The tubular member may have any structure as long as a voltage can be applied to the ion-supplying material contained therein by working together with the linear second electrodes and can be a cylindrical or tubular shape not having a closed end face. Furthermore, as long as the shape is cylindrical, the electrode may have a mesh-like (net) shape.

The tubular member may be formed by a tubular metal or may be an electrode having elasticity as in the second electrodes or may be formed of a material that is the same as that of the second electrodes.

In the tubular member serving as the first electrode, the thickness of the electrode is not particularly limited as long as the expansion/contraction deformation of the actuator is not hindered, but is preferably 1 μm or more and 50 mm or less, more preferably 5 μm or more and 20 mm or less. This is because that as long as the thickness of an electrode is 1 μm or more, the electrode can have sufficient electrical conductivity for functioning as the electrode of an actuator. As long as the thickness of an electrode is 20 mm or less, the electrode is inhibited from hardening and becoming friable due to the electrically conductive material contained therein. The thickness and the material of the electrode may not be the same in all electrodes and may be appropriately selected according to desired actuator characteristics.

The linear second electrodes are formed of a material having elasticity and electrical conductivity. For example, the linear second electrodes can be formed of a polymer material having electrical conductivity and elasticity as described below.

It is not necessary that all the linear second electrodes have the same size and are made of the same material, and the shape and the length are not particularly limited. The second electrodes may have a circular columnar, elliptical columnar, rectangular columnar, semicircular columnar, circular truncated cone, or truncated pyramid shape, as long as it is linear. The shape can be appropriately selected by considering properties that are required in a desired actuator, such as rigidity and displacement force/displacement amount. A circular columnar or rectangular columnar shape, in particular, a circular columnar shape, is preferred than a circular truncated cone or truncated pyramid shape from the viewpoint of pressure resistance properties in pressing pressure. For convenience of manufacturing, even if electrodes have the same shape, the electrodes may have different sizes, but the second electrodes can be composed of a plurality of the electrodes having the same or substantially the same shape. The term "substantially the same shape" refers to, for example, that the variation in size is 20% or less or that the variation in deformation ratio of the cross-sectional shape is 20% or less, when no voltage is applied.

The number of the plurality of linear second electrodes is not particularly limited, but can be appropriately determined according to easiness of manufacturing or the desired generating force of the actuator. The number of the second electrodes may be at least two, but 4 to 40, such as 4, 5, 6, 7, or 9, allows the linear second electrodes to be easily symmetrically arranged. However, the number also depends on the whole size of the actuator to be constituted, and when the diameter of the tubular member as the first electrode is very large with respect to the diameter of each linear second electrode (for example, a case in which the diameter of the linear second electrode is about several micrometers and the diameter of the tubular member as the first electrode is several tens millimeters), 100 or more, moreover 1000 or more, of linear second electrodes may be arranged.

The plurality of linear second electrodes may be in partial contact with one another or may be willingly bundled, but may be completely separated from one another in such a manner that they are all in contact with the ion-supplying material, from the viewpoint of migration of electrolyte ions by voltage application.

The term "separated from one another" refers to a condition in which a certain electrode is not in contact with other electrodes, and the electrode is apart from other electrodes with a space therebetween to allow the space to be filled with the ion-supplying material. That is, the ion-supplying material is disposed in the spaces formed by separating the electrodes from one another to increase the contact ratio of the electrodes with the electrolytes than that in a structure in which the electrodes are in contact with one another, resulting in an increase in generating force of the actuator.

In particular, the linear second electrodes may be rod-like electrodes arranged in parallel to one another.

In addition, as the linear second electrode, a polymer fiber (polymer fiber electrode, see below) containing an electrically conductive material can be used. Furthermore, a plurality of polymer fibers are twisted to form a rod-like electrode, and one or more thereof can be used as the linear second electrode or electrodes.

The size of the electrode is not particularly limited as long as expansion/contraction of the actuator is not hindered, but is preferably 0.05 μm or more and 50 mm or less, and more preferably 0.05 μm or more and 100 nm or less. The sizes and the materials of the electrodes may not be necessarily the same in all electrodes and can be appropriately selected according to desired actuator properties.

The shape of the actuator is not particularly limited. Examples of the shape include a circular column, an elliptical column, a rectangular column, a semicircular column, a circular truncated cone, and a truncated pyramid, and arbitrary cross-sections may be different from one another. The shape of the actuator may be appropriately selected by considering properties that are required in a desired actuator, such as rigidity and displacement force/displacement amount. A circular columnar or rectangular columnar shape, in particular, a circular columnar shape, can be selected from the viewpoint of pressure resistance properties in pressing pressure.

The linear second electrode may be an anode electrode or a cathode electrode as long as it can work as one of a pair of opposing electrodes (opposite electrodes) that is formed with the tubular member serving as the first electrode disposed in the outer circumference.

In addition, the actuator may have a structure in which a linear second electrode is disposed at the central axis position of the actuator or a structure in which a linear second electrode is not disposed at the central axis position, and a plurality of the linear second electrodes can be arranged so as to be uniformly distributed in a cross section to the expansion/contraction direction in the actuator structure.

For example, as shown in FIG. 1A, a structure in which six electrodes are arranged so as to form a point symmetry structure of C6 with the central axis of the circular column as the rotation axis can give a stable generating force having a symmetry property in the expansion/contraction direction.

Other examples include structures in which the second electrodes are arranged to form a rotation symmetry of order Cn (n is an integer of 2 to 20).

The further outer circumference of the tubular member may be at least partially covered with flexible insulating layer, such as a silicone resin. By covering with a flexible insulating layer, the safety is increased, and, for example, an electrically conductive material can be handled as an object to be moved. The tubular member may be covered with a sealing film such as a polymer film or a metal foil film. Such a sealing film may be one that is used as a cover for a known ion conducting actuator. The sealing film can inhibit, for example, leakage or drying of the electrolytic solution.

A plurality of the actuators shown in FIG. 1A may be integrated to form an actuator-integrated structure. The integration gives an actuator generating a larger generating force.

Figure 2:
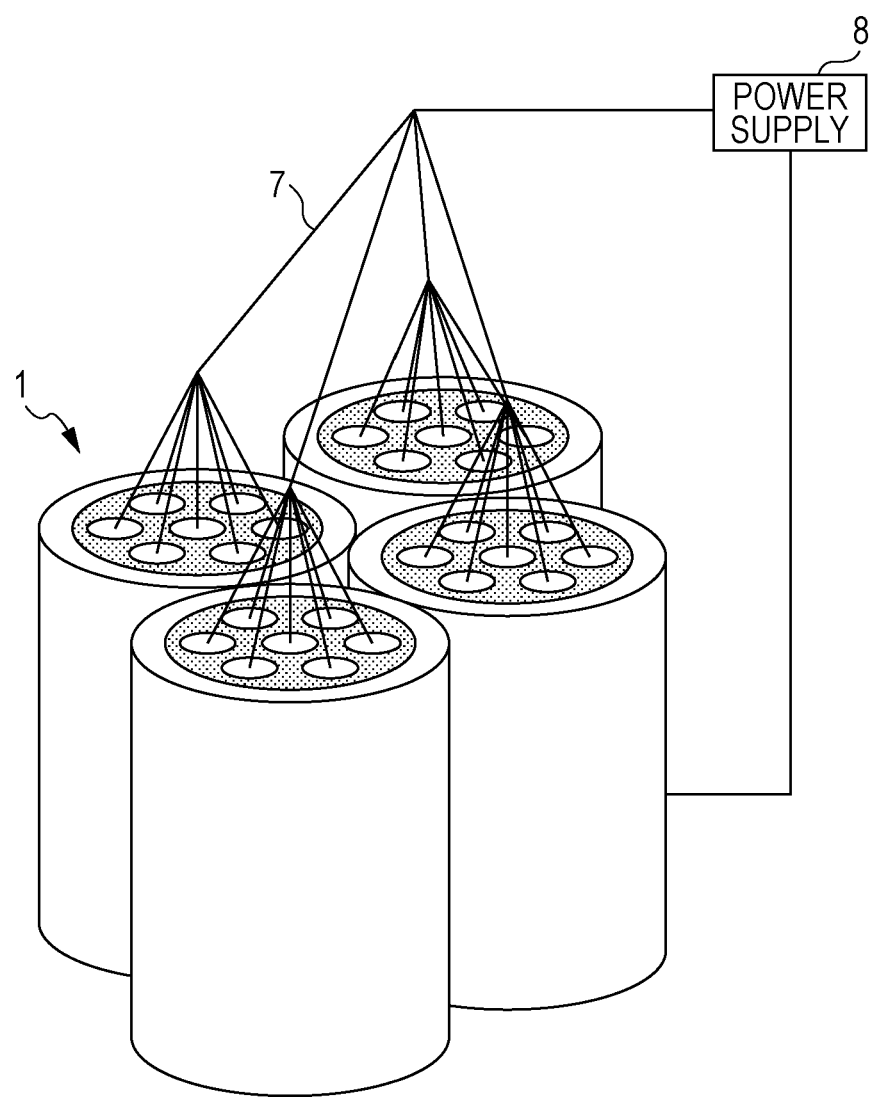
FIG. 2 shows an actuator-integrated structure in which four actuators are integrated.

FIG. 2 shows an actuator-integrated structure 4 in which four actuators 1 are integrated as an example of the actuator-integrated structure according to the present invention. By integrating the actuators, the generating force can be more effectively transmitted to an object, and it is also expected to improve the pressure resistance properties in pressing pressure. A clamping member (e.g., a clamping band) uniting the actuators may be used for bundling the plurality of actuators and holding them.

The actuators to be integrated may or may not be made of the same material in the same shape.

The length of the actuator is not particularly limited. When the actuators have a long length, resistance against buckling is improved by integrating them.

In the actuator-integrated structure of the present invention, the use of a clamping member having electrical conductivity and being electrically connected to the first electrode of each of the plurality of actuators can further reduce the size and makes the integration easy to produce an actuator giving a large generating force.

A specific structure is as follows:
(1) a plurality of actuators is integrated by being bundled with a clamping member having electrical conductivity;
(2) the first electrodes of actuators adjacent to each other are at least partially electrically connected to each other; and
(3) the first electrodes of the actuators positioned at the outer circumference of the integrated structure are at least partially electrically connected to the clamping member.

Here, since the clamping member has electrical conductivity, it can be used as an electrode (terminal electrode). Accordingly, the following effects can be expected.

That is, when a plurality of small-sized actuators of the present invention is used by being integrated, as described above, the generating force becomes large as a whole actuator device. However, concurrently, the wiring becomes complicated. Furthermore, for example, as shown in FIG. 2, when the plurality of actuators are integrated in such a manner that the first electrodes of the actuators are in contact with one another and that one of the plurality of actuators is connected to an external power source, due to parasitic resistances (e.g., internal resistance and leakage current between electrodes) in the actuator electrodes, the plurality of electrodes may not be efficiently applied with a uniform voltage.

That is, in the structure of the above (1) to (3), wiring connection from an external power source (power supply) to the first electrode of each actuator is simple, and efficient application of a uniform voltage to the first electrodes can be easily achieved. For example, in description with reference to the actuator shown in FIG. 3A, when a voltage is applied between electrodes by a power supply 8 through the clamping member 9, electrons (holes) tend to uniformly and well move toward all first electrodes of the integrated actuators to inhibit occurrence of a voltage difference between the first electrodes.

Figure 3A:
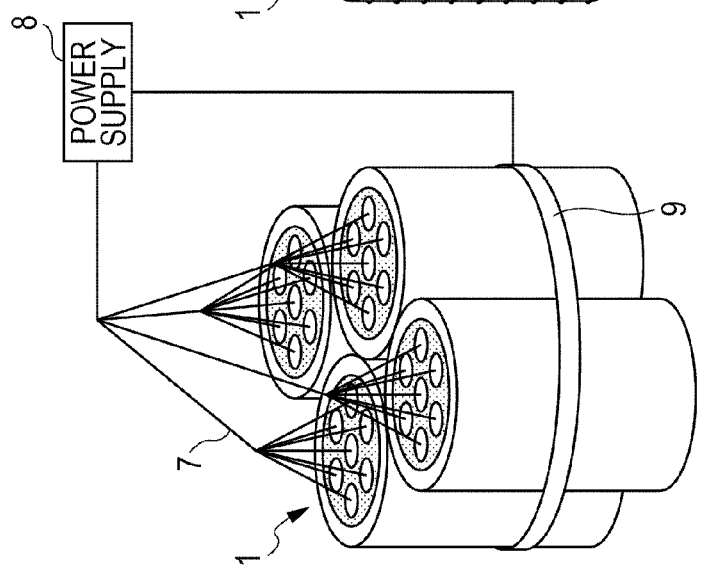
FIG. 3A is a schematic view describing an example of the actuator-integrated structure of the present invention in which the actuators are bundled with a clamping member having electrical conductivity.

Furthermore, it is possible to bind the actuator-integrated structure by the clamping member so as to regulate the expansion/contraction direction thereof. That is, as shown in FIG. 3A, the line-like member 9, such as a clamping member (clamping band), not only can integrate the actuators by bundling them but also can inhibit the expansion power of the first electrodes from heading to the direction perpendicular to the columnar direction during driving of the actuators. As a result, the displacement amount and the generating force of the actuator-integrated structure can be increased. The clamping member is not limited to the string-like member such as the clamping band. When the clamping member covers the columnar side surface of the actuator-integrated structure, such as a mesh film member 9a shown in FIG. 3B or a columnar member 9b shown in FIG. 3C, the displacement amount and the generating force of the actuator-integrated structure can be further increased.

The actuator can employ various known elastic electrode layers. For example, a material structure similar to the carbon nanotube (CNT) gel actuator described in Japanese Patent Laid-Open No. 2005-176428 can be employed. Specifically, an ion conducting soft actuator is constituted by disposing an ion-supplying material prepared by gelation of an ionic liquid being a nonvolatile ion conductive material between elastic electrodes (CNT gel electrodes) formed from carbon nanotube, an ionic liquid, and a polymer. The electrodes and the ion-supplying material may be thus used. Note that the gel actuator utilizing an ionic liquid can be driven in the air and has high stability.

The driving principle of an actuator according to the present invention will be described in more detail using a circular columnar actuator in which the outer circumference of linear second electrodes (composed of seven second electrodes) and an ion-supplying material is covered with a tubular member serving as a first electrode.

FIG. 1B shows a schematic view illustrating driving at a cross-section of the actuator 1 taken along the line IB-IB of FIG. 1A when the CNT gel electrodes are used as the first and second elastic electrodes and a gel composed of an ionic liquid and a polymer is used as the ion-supplying material.

In this actuator, positive ions (cationic species) and negative ions (anionic species) 6 of the ionic liquid 9 in the electrolyte move to and infiltrate into the cathode electrode layer (first electrode 2) and the anode electrode layer (second electrode 4), respectively, by applying a voltage between the first and the second electrodes. As a result, expansion/contraction drive is performed. The direction of the expansion/contraction drive is the direction of the block arrow of the actuator 3 in FIG. 1C. Note that even if there is a difference in volume expansion between the inner electrodes (linear second electrodes 4) and the outer circumferential electrode (tubular member 2 serving as the first electrode), the strain caused thereby is absorbed by the actuator as a whole because by that the ion-supplying material has a polymer gel containing positive ions and negative ions and that both the inner electrodes and the outer circumferential electrode have elasticity.

In the present invention, the term "expansion/contraction drive" refers to an approximately linear movement. That is, when a voltage is applied between an anode electrode and a cathode electrode, the actuator expands or contracts in approximately the same direction as the elongation direction of the linear second electrodes.

The actuator of the present invention is driven by expansion/contraction with a low driving voltage of about 0.1 to 10 V. When an ionic liquid is used as the electrolyte, considering a potential window, the application voltage may be 4 V or less. The driving mode can be a direct current or an alternating current according to a desired driving.

The linear second electrodes according to the present invention may be polymer fiber electrodes constituted of polymer fibers. The polymer fiber electrodes are fibers having at least one type of polymer containing a material having electrical conductivity (electrically conductive material) that may be an electrically conductive filler or an electrically conductive polymer.

In particular, the polymer fibers composed of a carbon-based electrically conductive material and a polymer can obtain high electrical conductivity even if the fiber diameter is small. That is, in polymer fibers having a smaller diameter, the electrically conductive material is strongly elongated in the fiber length direction in the narrower region to inhibit aggregation and tangles. As a result, the polymer fibers are regularly arranged in the polymer fiber length direction (uniformly dispersed).

The diameter of the polymer fiber can be 0.05 to 10 μm. In this range, the uniform dispersion ratio of the electrically conductive material in the polymer fibers is increased, and the electrical conductivity of the resulting electrically conductive material-containing polymer fibers is increased.

The cross-sectional shape of the polymer fiber is not particularly limited, and examples thereof include circular, elliptical, rectangular, polygonal, and semicircular shapes. The cross section may not have an accurate shape, and arbitrary cross-sections may have different shapes from one another.

In order to increase the surface conductivity, the surfaces of the polymer fibers may be provided with an electrically conductive material such as a metal or a carbon material. The diameter of the fiber refers to the diameter of a circular cross-section in a columnar fiber and, in fibers other than the circular columnar fiber, refers to the maximum length of lines that run through the center of gravity in a cross-section of the fiber.

The production process of the polymer fiber is not particularly limited, and examples thereof include extrusion, electrospinning, multi-component fiber spinning, polymer blend spinning, melt-blow spinning, and flash spinning techniques.

The electrode may be formed of a mixture of a polymer and an electrically conductive material. Usually, the electrically conductive material can contain one type or a mixture of carbon-based electrically conductive materials such as graphite, carbon black, acetylene black, ketjen black, carbon whisker, carbon (nano)fiber, activated carbon fiber, nanocarbon material, carbon nanotube (CNT), and nanocarbon particle. Furthermore, the electrode may be formed of a generally known electrically conductive polymer material, such as polyaniline, polypyrrole, polyparaphenylene, polythiophene, or derivatives thereof, alone or as a mixture with, for example, a polymer. In particular, from the viewpoint of electrical conductivity and ion adsorption for specific surface area, nanocarbon materials, in particular, carbon nanotubes can be used.

The carbon nanotube is a carbon material constituted by curling a graphite sheet into a cylindrical shape, and the cylinder diameter is 1 to 10 nm. The length in the longitudinal axis direction is usually of from several tens to several hundred micrometers. The length of so-called super growth CNT is about several millimeters, and such materials can be also used.

The carbon nanotube is a carbon-based material formed by rolling a graphene sheet (sheet made of graphene) into a tubular shape and is roughly classified based on the number of peripheral wall or walls into a single-wall carbon nanotube (SWCNT) and a multi-wall carbon nanotube (MWCNT), and various nanotubes are known.

Graphene is a part of a graphite structure and is an aggregate of carbon atoms where carbon six-membered rings having planar structures are two-dimensionally arranged, that is, a single layer of carbon.

Any type of carbon nanotube can be used as long as it is so-called carbon nanotube.

The term "nano-carbon particle" refers to a particle of a nano-scale ($10^{-6}$ to $10^{-9}$ m), the main component of which is carbon, such as a carbon nanohorn, amorphous carbon, and a fullerene, other than carbon nanotubes. The carbon nanohorn is a carbon nanoparticle having a shape where a graphite sheet is rolled up so as to close one end to form a conical shape.

The nano-carbon fiber is constituted of a graphite sheet rolled up into a cylindrical shape having a diameter of 10 to 1000 nm and is also called a carbon nanofiber. The carbon nanofiber has a fiber diameter of 75 nm or more and a hollow structure and is a carbon-based fiber having many branched structures. Examples of commercially available carbon nanofiber include VGCF and VGNF (both are trade names: manufactured by Showa Denko K.K.).

The addition amount of an electrically conductive material to an electrode may be 1 wt % or more and 90 wt % or less. When the amount of the electrically conductive material is 90 wt % or less, a self-organized flexible film can be easily obtained, and when the amount is 1 wt % or more, a sufficient electrical conductivity can be obtained.

The polymer constituting the electrode is not particularly limited as long as it has flexibility so as to be deformed according to deformation of the actuator, and a polymer being hardly hydrolyzed and being stable in the air can be used.

Examples of such a polymer include polyolefin polymers such as polyethylene and polypropylene; polystyrene; polyimide; polyarylenes (aromatic polymers) such as polyparaphenylene oxide, poly(2,6-dimethylphenylene oxide), and polyparaphenylene sulfide; those where a sulfonate group ($-SO_3H$), a carboxyl group ($-COOH$), a phosphate group, a sulfonium group, an ammonium group, or a pyridinium group is introduced in a polyolefin polymer, polystyrene, polyimide, or polyarylene (aromatic polymer); fluorine-containing polymers such as polytetrafluoroethylene and polyvinylidene fluoride; perfluorosulfonic acid polymers, perfluorocarbonic acid polymers, and perfluorophosphoric acid polymers where a sulfonate group, a carboxyl group, a phosphate group, a sulfonium group, an ammonium group, or a pyridinium group is introduced to a skeleton of a fluorine-containing polymer; polybutadiene-based compounds; polyurethane-based compounds such as elastomer and gel; silicone-based compounds; polyvinyl chloride; polyethylene terephthalate; nylon; and polyalylate. These may be used alone or in a combination thereof or may be added with a desired functional group or may be formed into a copolymer with another polymer.

In particular, from the viewpoint of affinity with the ionic liquid, poly(vinylidene fluorine)-hexafluoropropylene copolymer (PVDF-HFP), poly(vinylidene fluorine) (PVDF), and polymethyl methacrylate (PMMA) can be used. In addition, a polymer having high compatibility with the ion-supplying material can be used. Higher compatibility and bondability (adhesion of bonded interface) with the ion-supplying material can constitute a stronger actuator. Therefore, the polymer constituting the electrode may be a polymer that has the same type of, similar, or identical skeletal structure (polymer structure) of the polymer compound constituting the ion-supplying material or a polymer that has the same type of, similar, or identical functional group of the polymer compound constituting the ion-supplying material.

In order to uniformly applying a voltage to the entire actuator, the electric resistance value of the electrode can be 1000 $\Omega \cdot cm$ or less. Since a lower resistance gives better actuator driving properties, the electric resistance value may be 100 $\Omega \cdot cm$ or less.

The electrical conductivity as a polymer electrode tends to be improved by increasing the dispersibility of the electrically conductive material in the polymer. Accordingly, a dispersant may be used. For example, the aggregation of carbon nanotubes is loosened by an ionic liquid to improve dispersibility and thereby increase electrical conductivity.

The Young's moduli of the first and second electrodes that expand and contract are not particularly limited and may be 0.1 to 600 MPa. In this range, the flexibility and the elasticity of the electrodes applied to an actuator are improved to increase plastic deformation resistance. Accordingly, an ion conducting actuator having higher repeating durability can be produced.

When the electrode is formed of an electrically conductive material and a polymer, the amount of the polymer contained in the electrode is 5 wt % or more and 80 wt % or less, preferably 10 wt % or more and 60 wt % or less. A higher weight ratio of the electrically conductive material with respect to the polymer amount is preferred from the viewpoint of electrical conductivity, but a polymer amount of 5 wt % or more can constitute a self-organized electrode having mechanically sufficient strength.

The ion-supplying material includes a polymer gel containing positive ions and negative ions. The polymer gel can be made of a flexible material having flexibility not to hinder the drive of the actuator.

In the description, the polymer gel is a polymer constituting a three-dimensional network structure by chemical bonds or interaction between polymer molecular chains and is composed of the polymer and a liquid medium (for example, an ionic liquid or a liquid dissolving an electrolyte) contained in the polymer. Examples of the polymer used in the polymer gel include fluorine-containing polymers such as tetrafluoroethylene and polyvinylidene fluoride; polyolefin-based polymers such as polyethylene and polypropylene; polybutadiene-based compounds; polyurethane-based compounds such as elastomer and gel; silicone-based compounds; thermoplastic polystyrene; polyvinyl chloride; and polyethylene terephthalate. These may be used alone or in a combination thereof or may be added with a desired functional group or may be formed into a copolymer with another polymer.

As the electrolyte contained in the polymer, various materials can be used. Examples of the electrolyte include lithium bromide, triethylmethylammonium tetrafluoroborate, sodium oleate, lithium fluoride, sodium bromide, and magnesium chloride.

The electrolyte made into an ionic liquid can be recognized as a nonvolatile electrolytic solution and can constitute an actuator that can be driven in the air.

The ionic liquid is also called ordinary temperature molten salt or simply molten salt and is a salt exhibiting a molten state in a broad temperature range including ordinary temperature (room temperature), for example, a salt exhibiting a molten state at a temperature of 0° C., preferably at a temperature of −20° C., and more preferably at a temperature of −40° C. The ionic liquid used in the present invention may have high ion conductivity. Examples of the ionic liquid include imidazolium salts, pyridinium salts, ammonium salts, and phosphonium salts. Furthermore, a combination of two or more of the above-mentioned ionic liquids may be used.

More specific examples of the ionic liquid are those composed of positive ions (cations, e.g., imidazolium ions) shown by any of the following formulae (1) to (4) and negative ions (anions).

[Chem. 1]

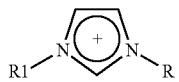   (1)

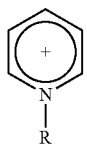   (2)

$[NR_xH_{4-x}]^+$   (3)

$[PR_xH_{4-x}]^+$   (4)

In the formulae (1) to (4), R denotes an alkyl group having 1 to 12 carbon atoms or a functional group including an ether bond and having 3 to 12 carbon and oxygen atoms in total number. In the formula (1), R1 denotes an alkyl group having 1 to 4 carbon atoms or a hydrogen atom. In the formula (1), R and R1 may be different from each other. In the formulae (3) and (4), each x is independently an integer of 1 to 4. Examples of the functional group including an ether bond and having 3 to 12 carbon and oxygen atoms in total number include alkoxyl groups shown by —$R_2$—O—$R_3$, wherein $R_2$ and $R_3$ are each an alkyl group having 2 to 11 carbon atoms in total number.

The negative ion can be at least one kind selected from a tetrafluoroboric acid anion, a hexafluorophosphoric acid anion, a bis(trifluoromethanesulfonyl)imidic acid anion, a perchloric acid anion, a tris(trifluoromethanesulfonyl)carbon acid anion, a trifluoromethanesulfonic acid anion, a dicyanamide anion, a trifluoroacetic acid anion, an organic carboxylic acid anion, and halogen ions.

The volume of the ion-supplying material is not particularly limited as long as the insulation between the linear second electrodes and the tubular member as the first electrode is maintained, and the area ratio of the linear second electrodes to the total of the second electrodes and the ion-supplying material in a cross section perpendicular to the long length direction of the actuator can be 10% or more and 90% or less. If the area occupied by linear second electrodes is higher than 90%, the ion-supplying material may not contain ions in an amount necessary for obtaining sufficient drive. On the other hand, if the area is less than 10%, the above-mentioned Expression [8] may not be satisfied.

Regarding Clamping Member Having Electrical Conductivity

The clamping member having electrical conductivity used in the present invention is not particularly limited as long as it has good electrical conductivity and does not damage the actuator, and publicly known electrically conductive cloth, electrically conductive band, and also wire mesh can be used. The wire mesh is not particularly limited as long as it is made of a material having good electrical conductivity, sufficient elasticity, and good workability, and the material may be, for example, stainless steel wire, tin-plated copper wire, copper weld wire (tin plating copper steel), monel wire (alloy of copper and nickel), or aluminum wire. Furthermore, the mesh pores of the wire mesh may be filled with elastomer. The elastomer may be silicone rubber, or the silicone rubber may be used as electrically conductive elastomer by filling the silicone rubber with electrically conductive particles. The electrically conductive particles may be, for example, fine powder, foil, or a fiber of a carbon-based material, such as carbon black, carbon fiber, or graphite, and a material such as silver, copper, aluminum, chromium, titanium, tungsten, cobalt, zinc, nichrome, an alloy thereof, or glass coated by a metal. Furthermore, the clamping band having electrical conductivity may be formed by a braid of thread spirally wound with metal foil or a sheet material including metal foil laminated on a film material of a synthetic resin such as polyvinyl chloride. In addition, a combination of them can be used.

The clamping member may be in a string form such as a clamping band as described above or may be a combination of a plurality of strings. Furthermore, the clamping member may be belt-shaped or may be a mesh film or a film-like or columnar form. In particular, the entire side face of the actuator may be bundled from the viewpoint of increasing the displacement amount and the generating force. Furthermore, a combination of these clamping members may be used, and an optimal clamping member can be appropriately selected according to the desired actuator. In addition, from the viewpoint of increasing the displacement amount and the generating force, the clamping member may have a Young's modulus larger than that of the actuator device.

The actuator according to the present invention may be produced by any method as long as a columnar ion conducting actuator can be produced. Examples of the production process are shown below.

In a first production process, linear second electrodes are produced in advance and are each covered with a film-like formed ion-supplying material. These linear second electrodes are bundled and put in a desired shaping die, and the spaces between the electrodes are filled with a molten electrolyte, followed by cooling and drying.

Then, the resulting product is wound and covered with a tubular member in a film-like form serving as a first electrode and, optionally, a sealing film and an insulating film, sequentially, to produce an ion conducting actuator of the present invention.

The covering step in the above may be performed at a temperature near the melting point of the polymer material constituting the ion-supplying material and/or the electrodes for enhancing adhesiveness between the tubular member and the polymer material.

In a second production process, pastes for producing the electrodes and the ion-supplying material are simultaneously extrusion-molded with a certain die.

In this process, various columnar actuators can be simply produced.

Specifically, the respective master pastes for the electrode layer and the ion-supplying material are each prepared by mechanically kneading predetermined materials in the presence of an appropriate solvent (for example, tetrahydrofurane, methyl ethyl ketone, N-methyl-2-pyrrolidone, or dimethylacetamide (DMAc)). A columnar actuator having a desired cross-sectional shape can be produced by simultaneously extrusion-molding these pastes with a die having a desired shape.

The temperature and the speed for the extrusion molding are not particularly limited as long as the molding is performed at a temperature lower than the decomposition temperature of the polymer, and may be appropriately selected according to the polymer binder used, the polymer compound constituting the actuator, and ionic species that move. For example, the temperature for molding can be 30 to 150° C. The molding speed can be 0.1 to 500 mm/min from the point of reducing uneven molding.

EXAMPLES

The present invention will be further specifically described with reference to examples and comparative examples below, but the present invention is not limited to these examples at all.

Driving of Actuator and Measurement of Force

A circular columnar actuator of each example shown below was prepared. A holder having a platinum electrode was fixed to one end face of the column. The other end face of the column was brought into contact with a load cell for measuring generating force, and, in this state, the generating force was measured by applying a voltage to the platinum electrode under conditions of a driving voltage of ±3.0 V and a driving frequency of 0.1 Hz.

Example 1

Circular Columnar Actuator Including Seven Linear Second Electrodes that are in Contact with One Another This example is a modification of the actuator 1 shown in FIG. 1A and relates to an actuator having seven linear second electrodes as that shown in FIG. 1A arranged so as to be in contact with one another.

In this example, as in that shown in FIG. 1A, the linear second electrodes and the tubular member serving as the first electrode are connected to a power supply via respective leads.

The actuator is configured so that expansion/contraction in the columnar axis direction of the actuator occurs by applying a potential difference between the first and the second electrodes. Since the flexible electrodes and ion-supplying material are employed, the actuator is excellent in elasticity as a whole.

Next, a process of producing a soft actuator according to an example will be specifically described.

The ion-supplying material used in the example is constituted of an ionic gel (polymer gel containing ionic liquid) formed by gelation of 1-butyl-3-methylimidazolium tetrafluoroborate (BMIBF4) and a poly(vinylidene fluoride)-hexafluoropropylene copolymer (PVDF-HFP).

The linear second electrodes and the tubular member serving as the first electrode are produced by a bucky gel (CNT gel) formed by a single-wall carbon nanotube (SWCNT), BMIBF4, and PVDF-HFP.

More specifically, the actuator is produced by the following process.

PVDF-HFP (10 g), THF/acetonitrile (5/1), and BMIBF4 (10 g, ionic liquid) were mixed while heating at 80° C. to form a paste-like master batch of the ion-supplying material.

Separately, SWCNT (5 g, average diameter: about 1 nm, average length: about 1 μm), BMIBF4 (10 g), and dimethylacetamide (DMAc, 1 mL) were mixed, followed by ball-mill treatment for 30 minutes to obtain a paste. Then, PVDF-HFP (8 g) was added to this paste, followed by further ball-mill treatment for 30 minutes to obtain a paste-like master batch for electrodes.

Then, each of the resulting paste-like master batches was extrusion-molded using a corresponding die at a temperature of 80° C. and an extrusion rate of 10 mm/min, followed by drying at 80° C. for 3 hours to produce actuators. The produced actuator was a circular column having a size of about 30 mm in length and about 7 mm in diameter as a whole, and the ion-supplying material surrounding the linear second electrodes had a diameter of about 5 mm, and each linear electrode had a diameter of about 1.5 mm.

In this process, the occupancy of the linear second electrodes in the ion-supplying material was about 60%.

The Young's moduli of the actuator and the linear second electrode cut out from the actuator can be determined from stress-strain characteristics obtained by subjecting them to a tensile test with a tensile tester.

The cross-sectional area (S) of the actuator and the cross-sectional area ($S_1$) of the linear second electrodes were determined as averages from SEM photographs at five arbitrary cross sections. The resulting value of $S_1 \times Y_1$ was 2.2 times that of $\frac{1}{2}(S \times Y)$, wherein Y and $Y_1$ denote Young's moduli of the actuator and the second electrode, respectively.

The value was not largely different from the pseudo value calculated from analysis of the material composition, size, and so on of the linear second electrode.

This actuator expands and contracts without causing buckling, in the air, even at a driving voltage of about 4 V and, thereby, can smoothly push and move an object in a straight line direction. The degree of the expansion/contraction increases with electric energy applied from the electrodes. The generating force of the actuator becomes stronger with an increase in the degree of elongation. The performance of the actuator is not deteriorated after being driven 15000 times at ±1.0 V, 1 Hz (square-wave voltage). Thus, the actuator has high repeating drive durability.

Comparative Example 1

Actuator Formed of Single Linear Second Electrode

This comparative example relates to an actuator in which the central electrode is constituted of only one columnar electrode. This actuator is produced by the same process as that in Example 1 except that the number of the linear electrode is one. Herein, the occupancy of the linear second electrode in the ion-supplying material is about 10%.

As in Example 1, $S_1 \times Y_1$ and $\frac{1}{2}(S \times Y)$ of the actuator are determined to confirm that the value of $S_1 \times Y_1$ of the actuator is 60% of $\frac{1}{2}(S \times Y)$.

This actuator can push and move an object in the axis direction of the column, in the air, at a driving voltage of about 1 to 4 V when it is driven by expansion/contraction as in Example 1. However, the generating force per unit time comes short of that of the actuator of Example 1.

Comparative Example 2

Actuator Having a Linear Second Electrode Thicker than that in Comparative Example 1

This Comparative Example relates to an actuator having a linear second electrode thicker than that in Comparative Example 1.

In this Comparative Example, an actuator is produced by the same process as that in Example 1 except that a single linear second electrode is formed in such a manner that the cross-sectional area of the linear second electrode at a cross section perpendicular to the linear second electrode is equal to the sum of the cross-sectional areas of the seven linear second electrodes of the actuator in Example 1. Herein, the occupancy of the linear second electrode in the ion-supplying material is about 60%.

As in Example 1, $S_1 \times Y_1$ and S×Y of the actuator are determined to confirm that the value of $S_1 \times Y_1$ is 2.2 times that of ½(S×Y).

This actuator can smoothly push and move an object in a straight line direction (axis direction of the column) in the air even at a driving voltage of about 1 to 4 V when it is driven by expansion/contraction as in Example 1. However, the generating force is lower than that of the actuator of Example 1 because ions hardly move inside the linear electrode.

Example 2

Linear Second Electrodes are Separated from One Another in the Actuator of Example 1

This example is a modification of the soft actuator of Example 1 and relates to a columnar actuator where the linear second electrodes are separated from one another.

FIG. 1A is a perspective view of this actuator (herein, it can be confirmed at one end face of the actuator that the linear second electrodes are separated from one another).

This actuator is produced as in Example 1 except that the linear second electrodes are disposed so as to be separated from one another. The occupancy of the linear second electrodes in the ion-supplying material is about 60%. This actuator also expands and contracts in the columnar axis direction of the actuator without causing buckling, in the air, at a driving voltage of about 4 V, when it is applied with electric energy through the electrodes.

As in Example 1, $S_1 \times Y_1$ and S×Y of this actuator are determined to confirm that the value of $S_1 \times Y_1$ is 2.2 times that of ½(S×Y). In addition, the adhesion with the electrolyte is better than that in Example 1 because all the linear second electrodes are separated from one another, and, as a result, the generating force is improved compared to that in Example 1.

Example 3

Addition of Six Linear Second Electrodes Having Smaller Diameters in the Actuator of Example 2

In this Example, in addition to the seven linear second electrodes in Example 2, six linear second electrodes each having a diameter of about 600 μm are formed, that is, 13 linear second electrodes in total are formed.

This actuator is produced as in Example 1 except that 13 linear second electrodes are formed.

Herein, the occupancy of the linear second electrodes in the ion-supplying material is about 70%. This actuator also expands and contracts in the columnar axis direction of the actuator when it is applied with electric energy through the electrodes.

As in Example 1, $S_1 \times Y_1$ and SXY of this actuator are determined to confirm that the value of $[½(S \times Y)]/[S_1 \times Y_1]$ is 1.3 times that of Example 2.

This actuator can perform stronger pushing movement than those in Examples 1 and 2, because the number of the linear second electrodes is larger than those in Examples 1 and 2 and also because the sum of the cross-sectional areas of the linear second electrodes is larger than those in Examples 1 and 2.

Example 4

Actuator-Integrated Structure where Four Actuators in Example 2 are Bundled

This example relates to an actuator-integrated structure where four actuators in Example 2 are bundled. The actuators of this example are constituted as shown in FIG. 2. The actuators each expand and contract in the columnar axis direction of the actuators when they are each applied with electric energy through the electrodes. The actuators are bundled with a clamping band (not shown), and, thereby, the generating force is larger than that when they are arranged with sufficient spaces therebetween.

In addition, since the actuators are bundled, the pressure resistance performance is higher than that in Example 2, and the performance of the actuators is not deteriorated after being driven 50000 times at ±1.0 V, 1 Hz (square-wave voltage) in an object-loaded state. Furthermore, the performance of the actuators is not deteriorated after being driven 50000 times at ±1.0 V, 1 Hz (square-wave voltage), under application of lateral vibration. Thus, the structure is significantly suitable for being applied to pushing movement.

Comparison of Actuator Performance

Performance of the actuators of Examples 1 to 4 and Comparative Example 1 are measured by applying an alternating current of 0.1 Hz at ±3.0 V to the actuators using the above-described measurement method and measurement apparatus to obtain the results shown in Table 1.

TABLE 1

Comparison of generating force when drive voltage is applied to actuators of Examples 1 to 4 and Comparative Example 1

| No. | Actuator | Increase ratio (%) in generating force $\left(\frac{\text{(generating force in Example)} - \text{(generating force in Comparative Example 1)}}{\text{generating force in Comparative Example 1}}\right) \times 100$ |
|---|---|---|
| 1 | Actuator in Example 1 | 500 |
| 2 | Actuator in Example 2 | 580 |
| 3 | Actuator in Example 3 | 620 |
| 4 | Actuator in Example 4 | 2700 |

It can be confirmed from Table 1 that the generating force of each expansion/contraction actuator is significantly improved by that the actuator satisfies the Expression (1) and that a columnar actuator is constituted so as to have a plurality of linear second electrodes.

Furthermore, it can be confirmed from Table 1 that since the rate of increase in the generating force of the actuator of Example 2 is larger than that of Example 1, the generating force of the actuator is more increased by at least partially separating the linear second electrodes from one another. Furthermore, it can be also confirmed that since the rate of increase in the generating force of the actuator of Example 3 is larger than that of Example 2, the generating force can be improved by increasing the number of the linear second electrodes within the range in which the Expression (1) is satisfied. In addition, it can be also confirmed that since the rate of increase in the generating force of the actuator of Example 4 is larger than that of Example 3, the generating force is increased by integrating actuators.

Example 5

This example is a case in which a part of outer circumference of actuators is bundled with a clamping member having an electrical conductivity.

Note that in the integrated structure of this example, the first electrodes of actuators adjacent to each other are at least partially in electrical contact with each other, unless otherwise specified. Furthermore, the first electrodes of actuators positioned on the outer circumference of the integrated structure are at least partially in electrical contact with the clamping member.

FIG. 3A is a schematic view illustrating an actuator-integrated structure of this example in which a single linear clamping member having electrical conductivity is employed.

Figure 3B:
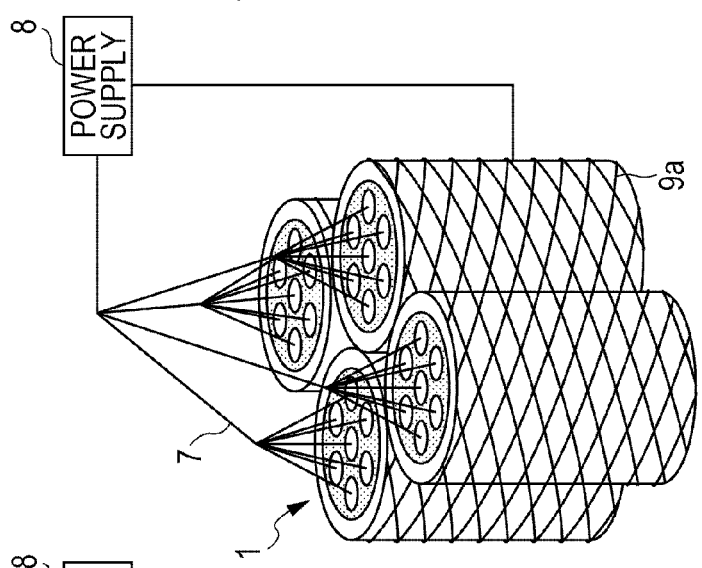
FIG. 3B is a schematic view describing another example of the actuator-integrated structure of the present invention in which the actuators are bundled with a clamping member having electrical conductivity.

FIG. 3B is a schematic view illustrating an actuator-integrated structure of this example in which a mesh film clamping member 9a having electrical conductivity is employed.

Figure 3C:
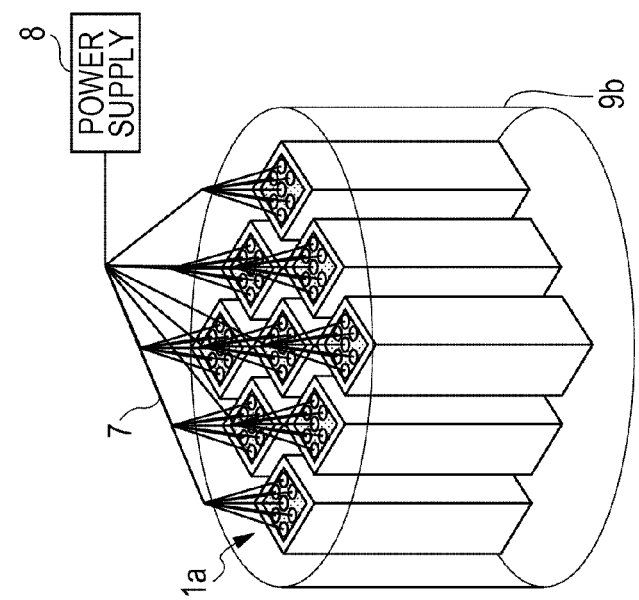
FIG. 3C is a schematic view describing another example of the actuator-integrated structure of the present invention in which the actuators are bundled with a clamping member having electrical conductivity.

FIG. 3C is a schematic view illustrating an actuator-integrated structure (each actuator has a hexagonal columnar shape 1a) of this example in which a columnar clamping member 9b having electrical conductivity is employed.

In all actuators shown in FIGS. 3A to 3C, the second electrodes and the clamping member 9 (or 9a or 9b) are wiring connected to the power supply 8 through wiring so that application of a voltage to the actuators is possible.

In also the actuators in this example, a voltage is applied well and uniformly to the actuators by switching on the power supply. On this occasion, each actuator-integrated structure performs elongation deformation movement in the columnar direction.

The actuators can change the direction of the applied voltage to the opposite direction by flipping the switch. As a result, contraction deformation can be rapidly performed by inverting the voltage at the state that the actuators have expanded. In addition, the deformation amount can be adjusted by the flipping of the switch and the control of the output of the power supply.

Since a part of the outer circumference of the actuators is bundled by the clamping member having electrical conductivity, the shapes of the actuators of the present invention can be maintained without using an additional fixture, and wiring connection from an external power source (power supply) can be easily achieved through the clamping member.

Consequently, the reduction in size and the integration can be easily achieved, and an actuator giving a large generating force can be produced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-114476, filed May 18, 2010, which is hereby incorporated by reference herein in its entirety.

The invention claimed is:

1. A columnar ion conducting actuator comprising a tubular member serving as a first electrode, an ion-supplying material disposed inside the tubular member, and linear second electrodes disposed inside the tubular member, wherein
the ion-supplying material lies between the inner wall of the tubular member and the second electrodes;
the ion-supplying material includes a polymer gel containing positive ions and negative ions;
the tubular member contains a plurality of the second electrodes; and
either the positive ions or the negative ions contained in the polymer gel move toward the plurality of second electrodes side and the other ions move toward the inner wall side of the tubular member by applying a voltage between the tubular member and the plurality of second electrodes to elongate the ion conducting actuator.

2. The ion conducting actuator according to claim 1, wherein the second electrodes are polymer fibers containing an electrically conductive material.

3. The ion conducting actuator according to claim 1, wherein the linear second electrodes are arranged so as to be separated from one another.

4. The ion conducting actuator according to claim 1, wherein a cross section in the direction in which the actuator elongates satisfies the following Expression [8]:

$$S_1 \times Y_1 \geq (S \times Y) > 0 \qquad \text{Expression [8]}$$

(in the expression, S denotes the total area of the actuator in the cross section, $S_1$ denotes the area of the second electrodes in the cross section, Y denotes Young's modulus of the actuator, and $Y_1$ denotes Young's modulus of the second electrodes).

5. An actuator-integrated structure comprising a plurality of actuators according to claim 1 and a clamping member for bundling the plurality of actuators.

6. The actuator-integrated structure according to claim 5, wherein the clamping member has electrical conductivity and is electrically connected to the first electrode of each of the plurality of actuators.

* * * * *